US009327486B2

(12) United States Patent
Poplawski et al.

(10) Patent No.: US 9,327,486 B2
(45) Date of Patent: May 3, 2016

(54) TAPE DISPENSER AND TAKE-UP REEL FOR TAPE BACKING

(71) Applicant: Midsun Group, Inc., Southington, CT (US)

(72) Inventors: John Poplawski, Meridan, CT (US); Herbert Kleinegger, Bristol, CT (US); James Ferro, Shelton, CT (US)

(73) Assignee: THE MIDSUN GROUP, INC., Southbury, CT (US)

( * ) Notice: Subject to any disclaimer, the term of this patent is extended or adjusted under 35 U.S.C. 154(b) by 210 days.

(21) Appl. No.: 13/933,206

(22) Filed: Jul. 2, 2013

(65) Prior Publication Data
US 2015/0013918 A1    Jan. 15, 2015

(51) Int. Cl.
*B29C 65/00* (2006.01)
*B44C 7/00* (2006.01)
*B32B 38/10* (2006.01)
*B32B 43/00* (2006.01)
*B32B 38/04* (2006.01)
*B65H 35/00* (2006.01)
*B65H 37/00* (2006.01)

(52) U.S. Cl.
CPC ............... *B32B 43/006* (2013.01); *B32B 38/04* (2013.01); *B65H 35/00* (2013.01); *B65H 35/002* (2013.01); *B65H 35/0026* (2013.01); *B65H 35/0033* (2013.01); *B65H 35/0086* (2013.01); *B65H 37/00* (2013.01); *B65H 37/005* (2013.01); *B65H 37/007* (2013.01); *Y10T 156/1195* (2015.01); *Y10T 156/12* (2015.01); *Y10T 156/1348* (2015.01); *Y10T 156/1361* (2015.01); *Y10T 156/1788* (2015.01); *Y10T 156/18* (2015.01)

(58) Field of Classification Search
CPC ........ B65H 16/00; B65H 35/07; B65H 35/00; B65H 35/06; B65H 37/00; B65H 35/0033; B65H 35/0026; B65H 37/005; B65H 35/002; B32B 38/04; B32B 38/00; B32B 43/00; B32B 37/00; B32B 43/006; Y10T 156/10; Y10T 156/12; Y10T 156/1348; Y10T 156/1361; Y10T 156/18; Y10T 156/1788
See application file for complete search history.

(56) References Cited

U.S. PATENT DOCUMENTS

| 3,369,952 | A | * | 2/1968 | Rieger | 156/577 |
| 4,648,935 | A | * | 3/1987 | Brown et al. | 156/577 |
| 6,098,690 | A | * | 8/2000 | Robichaud | 156/577 |
| 6,672,531 | B1 | * | 1/2004 | Erlandson | 242/588 |
| 8,944,131 | B1 | * | 2/2015 | Williams | 156/527 |

* cited by examiner

*Primary Examiner* — Alex Efta
(74) *Attorney, Agent, or Firm* — Joseph R Carvalko

(57) ABSTRACT

This invention generally relates to a tape dispenser with automatic backing removal more particularly including a spindle rotatably mounted for receiving said supply of tape; a pinch roller set in tension having an adjustment to set the drag for the tape supply passing through the pinch rollers that convert a pull of the tape to a rotary motion; a take-up spindle for spooling the protective backing layer when separated from the tape; a set of drag washers to maintain an pre-set tension as the protective backing is spooled onto the take up spindle; a first gear responsive to the rotary motion of the pinch roller set and a second gear responsive to the motion of the first gear and axially attached to the take-up spindle for spooling the protective backing.

13 Claims, 6 Drawing Sheets

TAPE DISPENSER AND TAKE-UP REEL FOR TAPE BACKING

CROSS-REFERENCE TO RELATED APPLICATIONS

This is a continuation-in-part claiming the priority benefit under 35 U.S.C. 120 of U.S. patent application Ser. No. 13/890,672 Tape Dispenser and Take-Up Reel For Tape Backing filed May 9, 2013, Ser. No. 13/098,841 entitled Tape Dispenser and Take-Up Reel for Tape Backing filed May 2, 2011 and further claims the priority benefit under 35 U.S.C. 119 (e) of U.S. Provisional Application No. 61/330,694, Tape Dispenser and Take-up Reel for Associated Tape Backing filed on May 3, 2010, the entire disclosures of which are hereby incorporated by reference.

FIELD OF THE INVENTION

This invention relates to dispensers for tape with a backing requiring removal.

BACKGROUND OF THE INVENTION

A tape dispenser is a device that holds a roll of tape and has a mechanism on one end to cut or shear-off the tape. Dispensers vary widely based on the tape they dispense. Abundant and most common, clear tape dispensers are made of plastic and may be disposable. Other dispensers are stationary and may have sophisticated features to control tape usage and improve ergonomics. Tape dispensers for silicon tapes with release liner backing, which separate tape layers, are wound on a tape spool and require more complex tape dispensing mechanisms to allow dispensing while stripping-off the backing. Without an auto mechanism the process of removing the backing material is time consuming and wasteful, since in trying to remove the backing, strips of tape can damage the useful part of the tape, especially when lifting the backing with a fingernail or pointed tool to separate the layers. Manual methods for removing backing takes time and resources that can account for a significant dollar value in any project. The manual removal method also requires the use of both hands. Thus, the user has to stop a job, put down tools, and often removes work gloves to separate the backing. Adverse weather conditions make this all the more difficult.

In some applications a tape dispenser becomes a tool in applying the tape. This is especially the case in a production setting when the application of tape must be done quickly, as in a shipping department. These devices must dispense the tape without more than a user applying the adhesive backing to the work piece, such as a box that must be sealed. Such tape dispensing devices often have rollers that convey the tape to a user. If the tape includes a backing material then the dispensing device must reel the backing. A reliable tape dispensing system that achieves spooling becomes particularly difficult to reduce to practice when tapes having a variety of tape widths, thicknesses, and surface coefficients are used in differing environments that vary in humidity and temperature. Therefore a need exists for a tape dispensing device that allows for the foregoing variability not to interfere with the reliable operation needed in commercial and industrial applications.

SUMMARY OF THE INVENTION

This invention generally relates to a dispensing apparatus for tape with protective backing, including therein a tape supply spindle rotatably mounted for receiving a roll of tape; said protective backing separated from the tape and wound upon the core of a take-up spindle, said winding motion provided by a linear pull of the tape converted to a rotary motion as the tape interengages a compression member, such as a pinch roller set (composed of any material such as a rubber compound or plastic material with a suitable coefficient of friction between the roller and the tape), wherein a first gear affixed to the axle of one of the roller set meshes with and rotates a second gear in opposition to the first gear, thus spooling the protective backing on the take-up spindle.

More particularly the invention disclosed relates to a dispensing apparatus for tape having a protective backing layer thereon, including: a spindle rotatably mounted for receiving a supply of tape operably fed through a pinch roller set that further includes a lower pinch roller having a pre-set rolling drag adjusted by one or more coaxial drag washers, and an upper pinch roller having one or more springs imposing thereon a nip force between the upper and lower pinch rollers, such that when the tape interengages the nip of the pinched rollers, the lower pinch roller converts a linear motion of the tape to a rotary motion that turns a take-up spindle for spooling the protective backing layer; said take-up spindle rolling drag adjusted by one or more coaxial drag washers to maintain a pre-set rolling drag while the protective backing spools onto the take-up spindle.

The invention disclose herein is also a method for dispensing a tape with a protective backing including the steps of: inserting a roll of tape into housing having tape supply spindle for rotatably receiving said roll of tape; separating a portion of the tape from the protective backing; threading said tape portion into a pinched roller; threading said separated protective backing portion onto a rotatable take-up spindle; setting the drag on the take up reel; setting the drag on the lower pinch roller; setting the nip tension; rotating the pinched roller set in response to pulling said tape through the pinched roller set; winding said protective tape backing on the rotatable take-up spindle in response to one member of the rotating pinched roller set.

DETAILED DESCRIPTION OF THE INVENTION

Figure 1:
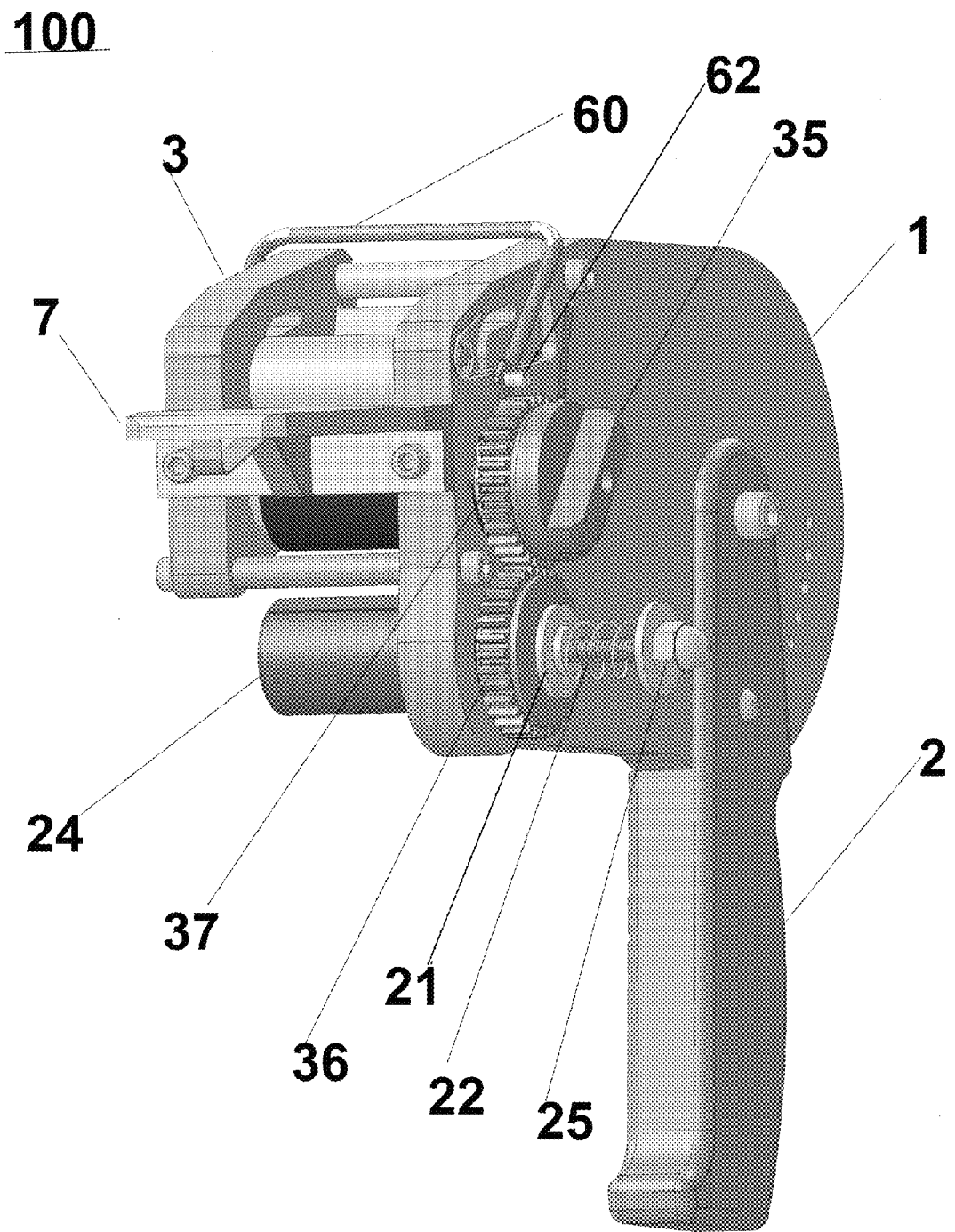
FIG. 1 is a frontal perspective view of the tape apparatus showing the relative positioning of parts for a tape dispensing mechanism in accordance with an embodiment of the invention.

The following detailed description includes the best mode of carrying out the invention and is made for the purpose of illustrating the general principles of the invention and should not be taken in a limiting sense. The scope of the invention is determined by reference to the claims. Each part or function is assigned, even if structurally identical to another part, a unique reference number wherever that part is shown in the drawing figures.

Figure 2:
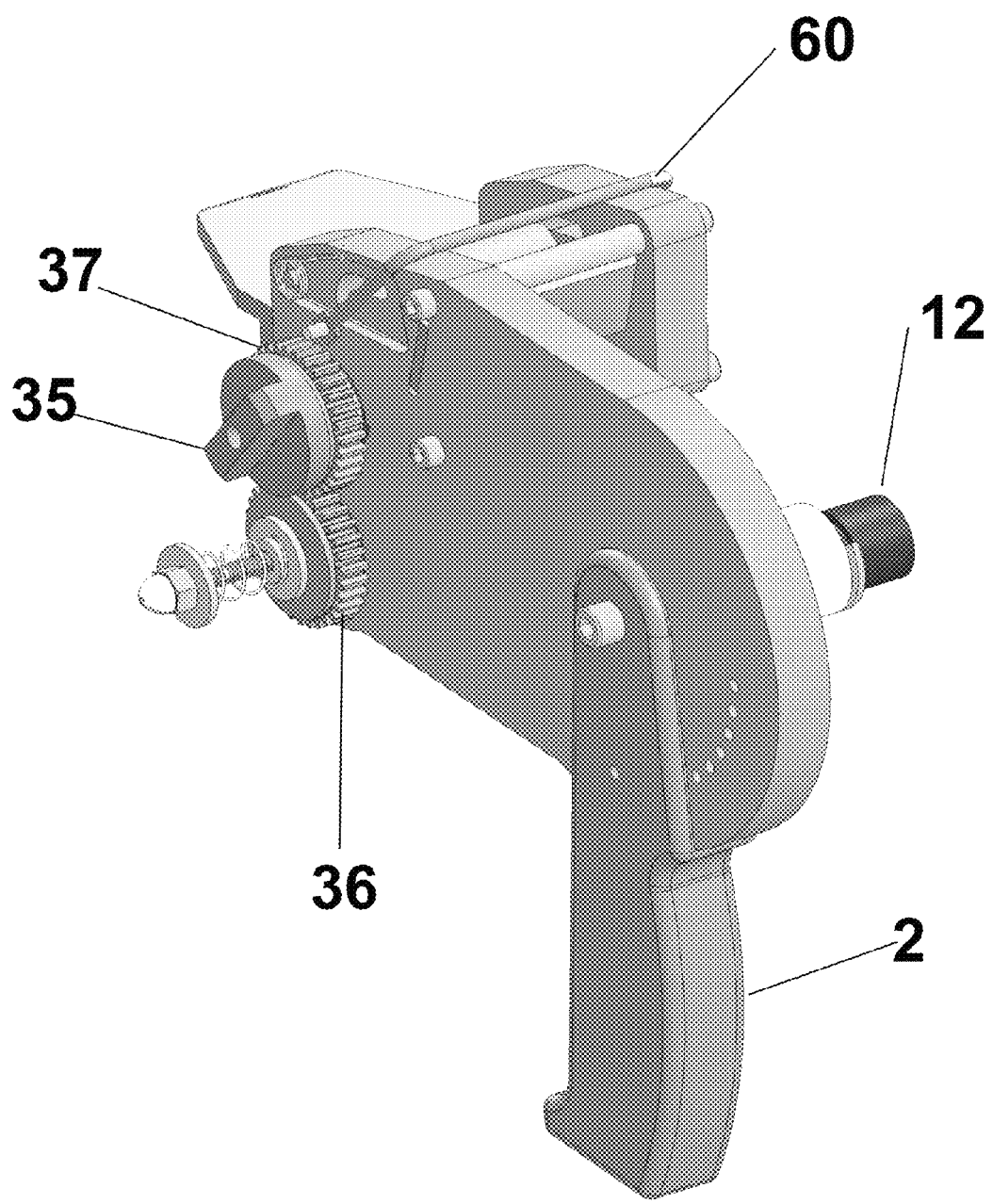
FIG. 2 is a rear perspective view of the tape apparatus showing the relative positioning of parts for a tape dispensing mechanism in accordance with an embodiment of the invention.
Figure 3:
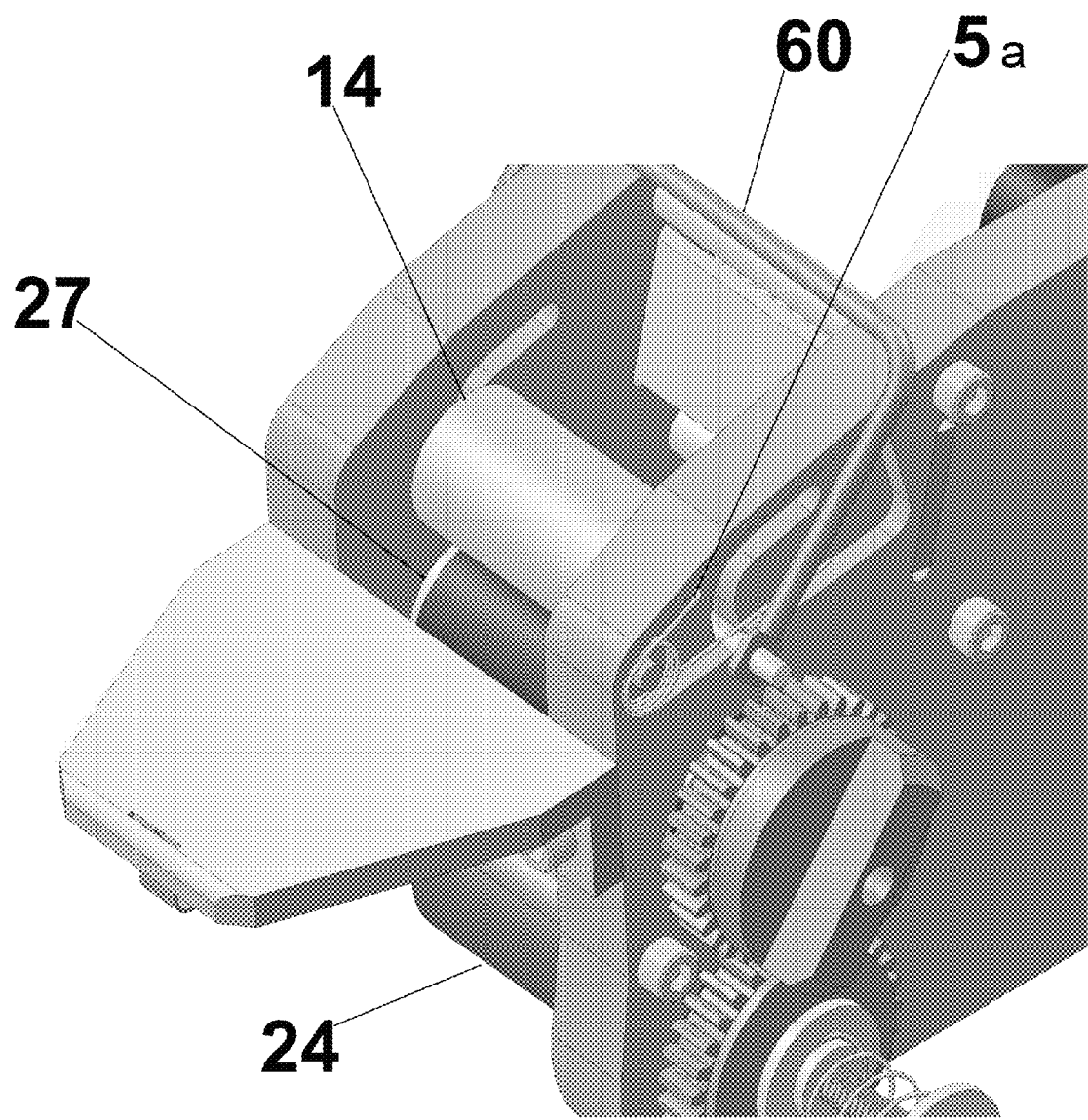
FIG. 3 is a perspective view of the tape apparatus showing the relative positioning of the bail lever for a tape dispensing mechanism in accordance with an embodiment of the invention.

Referring to FIG. 1 and FIG. 2, the major components of the apparatus 100 include: a side plate 1, a handle 2, and a small side plate 3. Affixed on the side plate 1 is a tape supply spindle sleeve 12 rotatably mounted for receiving a roll of tape that free-wheel on said spindle sleeve, and which is drawn through a friction carrying device, such as a set of pinched rollers (FIG. 3, 14, 27). The tape backing layer (FIG. 4, 50) is wound around the take up roller 24 for spooling the protective tape backing. An adjustment knob 35 is used to set the drag on the pinch roller set. Gear 37 conveys power to gear 36, which turns the take-up reel. A cutting mechanism 40 cuts the tape when dispensing for its intended application.

Referring to FIG. 3, pressure roller 14 is a pressurized feed roller, interfacing with the torsion spring 5a (N.B. torsion spring 5a is oppositely paired with torsion spring 5b each serving one side of release lever or release bail 60) to provide pressure to the nip between the pressurized feed roller 14 and roller 27 (FIG. 5, arbor 27 and a sleeve 29 are combined and referred to as roller 27 throughout), as the tape is being dispensed from the tape supply. When the torsion springs 5a, 5b (FIG. 3, FIG. 4) are released via release lever or bail 60 (FIG. 1), it opens the nip or gap between rollers for feeding a new roll of tape through the rollers (14, 27).

Figure 4:
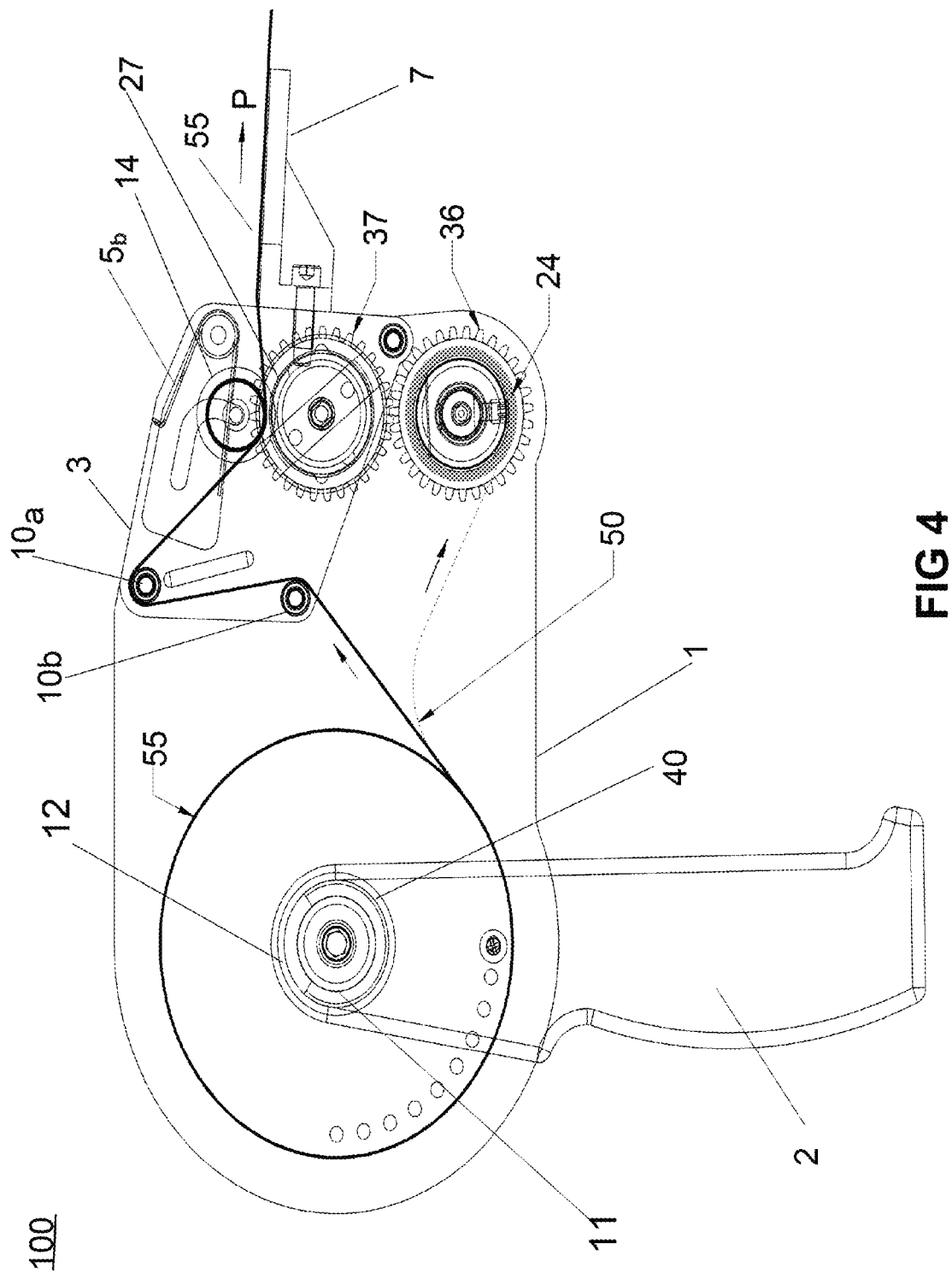
FIG. 4 is a plan view of the tape apparatus showing the relative positioning of parts for a tape dispensing mechanism in accordance with an embodiment of the invention.
Figure 5:
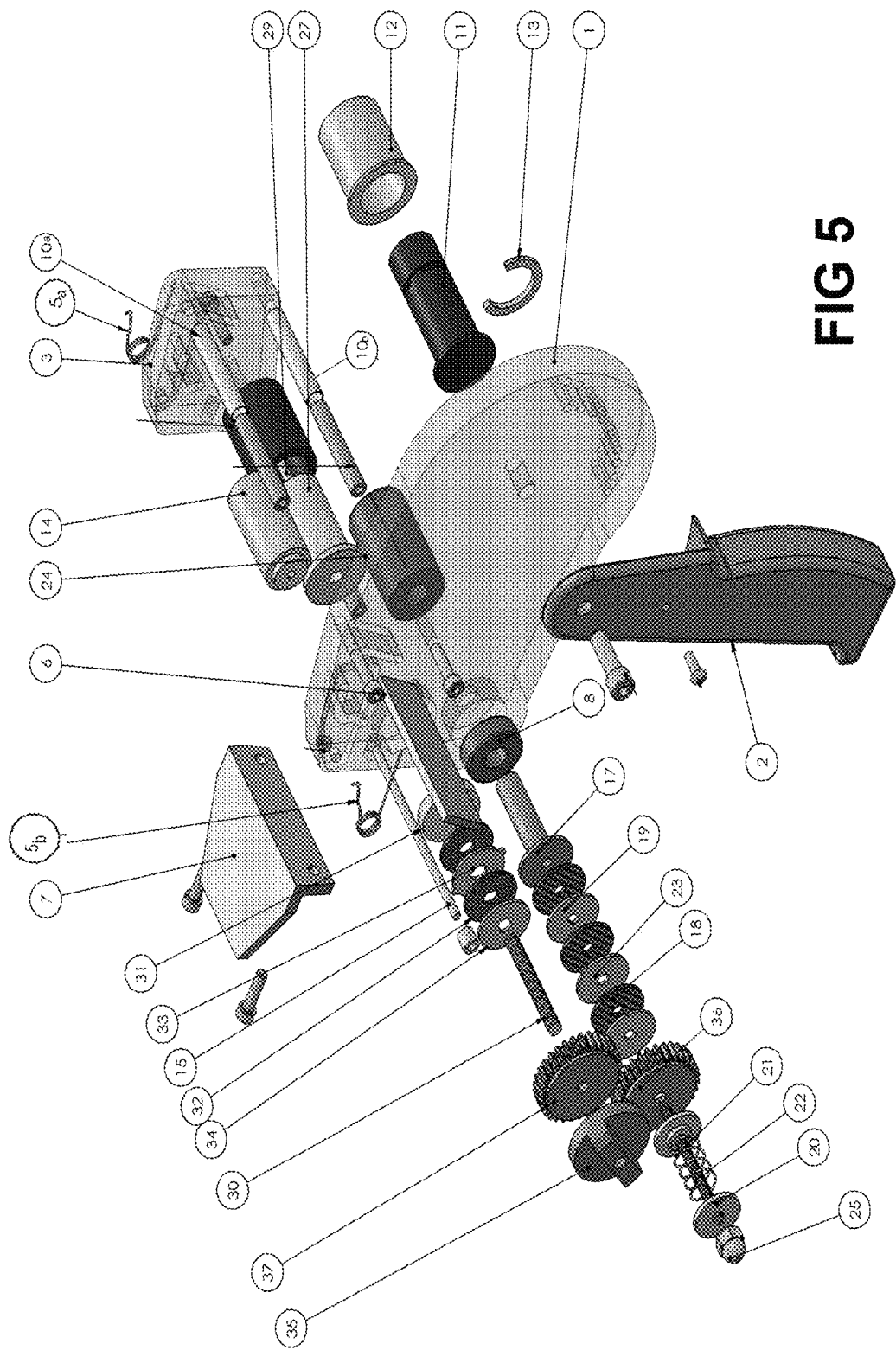
FIG. 5 is an illustrated parts breakdown showing the relative positioning of parts for a tape dispensing mechanism in accordance with an embodiment of the invention.

Referring to FIG. 1, FIG. 3 and FIG. 4, the spindle 12 rotatably mounted for receiving said supply of tape operably feeds through the pinch roller set (14, 27). The lower pinch roller 27 has a pre-set rolling drag associated with it that is adjusted and preset by one or more coaxial drag washers (FIG. 5, 32, 34). The upper pinch roller 14 has spring 5a, 5b that presets the nip force between the upper roller 14 and lower roller 27, such that when the tape interengages the nip of the rollers (14, 27), the lower pinch roller 27 converts a linear motion of the tape to a rotary motion that turns take-up spindle 24 for spooling the protective backing layer. The take-up spindle rolling drag is adjusted by one or more coaxial drag washers (FIG. 5, 18, 23) to maintain a preadjusted rolling drag while the protective backing spools onto the take-up spindle.

Referring to FIG. 4, an embodiment of the invention disclosed herein relates to dispensing apparatus 100 for dispensing tape 55, as by way of example and not limitation, silicone tape with protective backing 50 such as Mylar. Affixed on the side plate 1 is a tape supply spindle 11 covered by spindle sleeve 12 rotatably mounted for receiving a roll of tape 55 that free wheels on said spindle sleeve 12. The tape supply is threaded around guide roller 10b and 10a, and through the nip of pressure pinch rollers 14 and 27. As previously indicated, the tape backing 55 is directly wound around the take up roller 24.

FIG. 4 illustrates that on an application of a pulling force P to roll of tape 55, the rotatable take-up spindle 24 rotates, winding the backing tape 55 into a cylindrical roll. In one embodiment tape 50 supply rotatably mounts thereon spindle sleeve 12, wherein pulling with force P tape directs the protective backing away from the tape when the tape interengages and rotates lower pinch roller 27. The lower pinch roller 27 has first gear 37 affixed to the end of its axle that rotates a second gear 36 affixed to the end of the axle for the take-up spindle 24, such that the take up spindle 24 rotatably winds the protective backing 55 as the tape 50 is pulled through the roller set.

With reference to FIG. 1 and FIG. 5, the upper pinch roller 14, i.e. the mating roller to lower pinch roller 27, allows for an adjustable drag so as to create both tension and elongation of the tape 55 as it is being fed. A tape support plate 6 insures proper feed into the rollers. As mentioned above, lower pinch roller 27 incorporates a drive gear 37 that meshes with gear 36 to drive the tape backing 55 take up spindle 24 at by way of illustration and not limitation, a turning ratio of 1:1 or 1:1.5 although other turning rations can be employed in the range of 1.05 to 2.0.

In a non limiting embodiment, FIG. 5 illustrates the set of drag washers 18 and stainless steel washers 23 that maintain a preset tension as the protective backing is spooled onto the take up spindle. This is desirable to accommodate different tapes having different coefficients of surface friction, width, length and thickness of tape. In this non limiting embodiment, a multiple set of carbon fiber drag washers, such as washer 18 in combination with stainless steel washers, such as 23 installed between the side plate 1 and the lower pinch roller 27 have applied a pressure through spring 22 between washer 20 and washer 21, and tension adjusting nut 25 to allow a continuously adjustable tension and elongation of the tape as it is dispensed and utilized. With further reference to FIG. 5, a take up liner spool shaft 17 serves as the axle for the take up roller 24 fits through a bearing 8 to assist in the smooth rotation of the take up spool. The tabbed washer engages in plate number 1. The pin 15 is a spacer and does not engage with any functioning parts other than plate 1.

With reference to FIG. 1 and FIG. 5, an adjustment knob 35 that sets a drag on the lower pinch roller 27 is affixed through threaded rod 30 the drive gear 37. The assembly is joined through threaded rod 30 through threading locking plate 31 and fastening to the large side plate 1, to serve to rotate the lower pinch roller 27. In this embodiment, a multiple set of carbontex (carbon fiber) drag washers, such a washer 34 in combination with stainless steel washer 32 applied a pressure to the lower feed roller. A stainless steel washer 33 with ears or protruding tabs sets a limit on the rotation of the adjustment knob 35 by stopping at rolling pin 15.

With further reference to FIG. 1 and FIG. 5, the side plate 1 supply spindle sleeve 12 fits over an arbor 11 and is held in place by arbor snap ring 13. The assembly is then mounted on plate 1, for receiving a roll of tape that free wheels on said spindle sleeve and which as mentioned above, is drawn through a friction carrying device, such as a set of pinched rollers.

Figure 6:
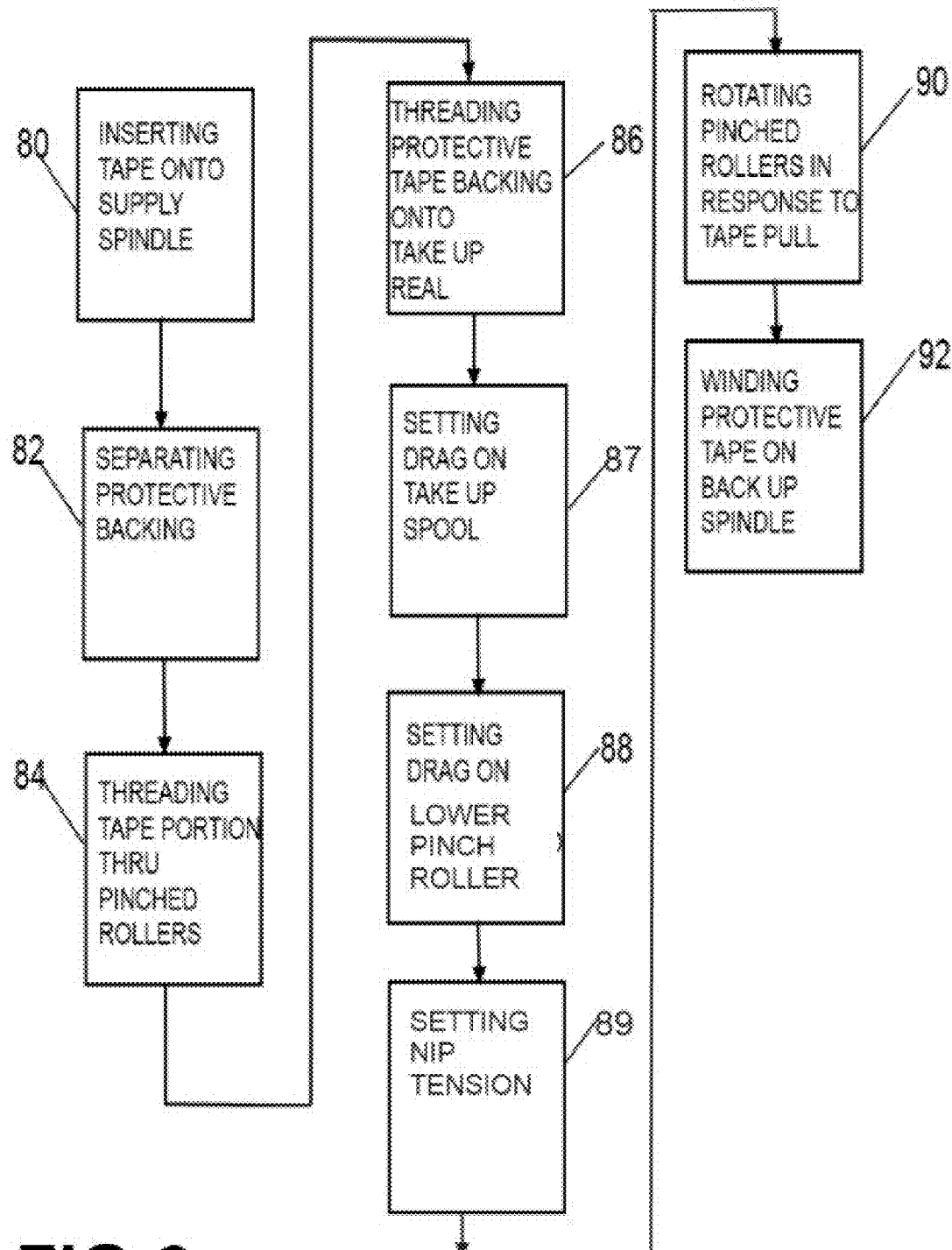
FIG. 6 is a flow chart of a method for using a tape dispensing mechanism in accordance with an embodiment of the invention.

As shown in FIG. 6, the invention herein also discloses a method for dispensing a tape with a protective backing including the steps of: (1) inserting 80 a roll of tape into housing having tape supply spindle for rotatably receiving said roll of tape; (2) separating 82 a portion of the tape from the protective backing; (3) lifting the bail and threading 84 said tape portion into a pinched roller set having two members; (4) threading 86 said separated protective backing portion onto a rotatable take-up spindle; (5) setting 87 the drag on the take up roller; (6) setting 88 the drag on the lower pinch roller; (7) setting 89 the nip tension; (8) rotating 90 the pinched roller set in response to pulling said tape through the pinched roller set; (9) winding 92 said protective tape backing on the rotatable take-up spindle in response to one member of the rotating pinched roller set.

While the foregoing invention has been described with reference to the above embodiments, additional modifications and changes can be made without departing from the spirit of the invention. Accordingly, such modifications and changes are considered to be within the scope of the appended claims.

We claim:

1. A dispensing apparatus for tape having a protective backing layer thereon comprises: a lower pinch roller having a pre-set rolling drag adjusted by one or more coaxial drag washers; and an upper pinch roller having one or more springs to set the nip force between the upper and lower pinch rollers, wherein when the tape interengages the nip of the pinched rollers, the lower pinch roller converts a linear motion of the tape to a rotary motion that turns a take-up spindle for spooling the protective backing layer; said rolling drag adjusted by one or more coaxial drag washers to maintain a preset rolling drag while the protective backing spools onto the take-up spindle.

2. The dispensing apparatus for tape having a protective backing layer in claim 1, further including a first gear responsive to the rotary motion of the pinch roller set and a second gear responsive to the motion of the first gear and axially attached to the take-up spindle for spooling the protective backing.

3. The dispensing apparatus for tape in claim 2, wherein a turns ratio between the first gear and the second gear is in the range of 1:1.05 or 1:2.0.

4. The dispensing apparatus for tape in claim 1 includes a tape cut-off device having one or more teeth.

5. The dispensing apparatus for tape in claim 1 includes a cut-off blade attached to a lever-action member.

6. The dispensing apparatus for tape in claim 1 includes adjustment knob to set the drag on the pinch roller set.

7. A dispensing apparatus for tape having a protective backing layer thereon comprises: a tape supply spindle rotatably mounted for receiving a roll of tape; a take-up spindle, which includes one or more drag washers, for spooling the protective backing, wherein pulling the tape separates the protective backing from the tape, which interengages a pinch roller set having a first gear affixed to an axle of a first roller that rotates a second gear affixed to the take-up spindle and a bail to release the pinched roller set, said first and second gear in a ratio within a range of 1:05 to 1:2.0, respectively.

8. The dispensing apparatus for tape in claim 7, wherein the one or more drag washers are made from carbon.

9. The dispensing apparatus for tape in claim 7, wherein a lower pinch roller includes one or more drag washers.

10. The dispensing apparatus for tape in claim 7, wherein an upper pinch roller includes one or more springs to set the tension on the pinch roller set.

11. The dispensing apparatus for tape in claim 10, wherein a bail lever releases the upper pinch roller includes one or more springs to set the tension on the pinch roller set.

12. A method for dispensing tape with protective backing, comprising the steps of: inserting a roll of tape into housing having tape supply spindle for rotatably receiving said roll of tape; separating a portion of the tape from the protective backing; threading said tape portion into a pinched roller set having two rotating members; threading said separated protective backing portion onto a rotatable take-up spindle; setting a drag on the take-up roller; setting a drag on the lower pinch roller; setting a nip tension on the pinched roller set; rotating the pinched roller set in response to pulling said tape through the pinched roller set; winding said protective tape backing on the rotatable take-up spindle in response to one member of the rotating pinched roller set; further comprising the step of applying a pulling force to a bail to release a pinched roller set having two rotating members.

13. The method for dispensing tape with protective backing in claim 12, further comprising the step of applying a pulling force to the roll of tape wherein the rotatable take-up spindle rotates, winding the backing tape into a cylindrical roll.

* * * * *